United States Patent
Li

(10) Patent No.: US 11,366,679 B2
(45) Date of Patent: Jun. 21, 2022

(54) GUEST OPERATING SYSTEM WAKE-UP METHOD, DEVICE, ELECTRONIC APPARATUS, AND READABLE MEDIUM

(71) Applicant: CLOUDMINDS (SHENZHEN) ROBOTICS SYSTEMS CO., LTD., Shenzhen (CN)

(72) Inventor: Yangang Li, Shenzhen (CN)

(73) Assignee: CLOUDMINDS (SHENZHEN) ROBOTICS SYSTEMS CO., LTD., Guangdong (CN)

(*) Notice: Subject to any disclaimer, the term of this patent is extended or adjusted under 35 U.S.C. 154(b) by 257 days.

(21) Appl. No.: 16/724,460

(22) Filed: Dec. 23, 2019

(65) Prior Publication Data

US 2020/0125380 A1    Apr. 23, 2020

Related U.S. Application Data

(63) Continuation of application No. PCT/CN2018/085993, filed on May 8, 2018.

(51) Int. Cl.
*G06F 9/455* (2018.01)
*G06F 9/30* (2018.01)
*G06F 9/4401* (2018.01)

(52) U.S. Cl.
CPC ...... *G06F 9/45545* (2013.01); *G06F 9/30083* (2013.01); *G06F 9/4418* (2013.01);
(Continued)

(58) Field of Classification Search
CPC ............. G06F 9/45545; G06F 9/30083; G06F 9/4418; G06F 9/45558; G06F 2009/45575; G06F 2009/45595
See application file for complete search history.

(56) References Cited

U.S. PATENT DOCUMENTS

| | | | | |
|---|---|---|---|---|
| 2011/0099267 A1* | 4/2011 | Suri | ...................... | G06F 9/4856 709/224 |
| 2011/0307887 A1* | 12/2011 | Huang | ................ | G06F 9/45558 718/1 |
| 2014/0245294 A1 | 8/2014 | Kaul | | |

FOREIGN PATENT DOCUMENTS

| CN | 102404253 A | 4/2012 |
|---|---|---|
| CN | 104469451 A | 3/2015 |

(Continued)

OTHER PUBLICATIONS

International Search Report for PCT/CN2018/085993, dated Feb. 14, 2019.

*Primary Examiner* — Dong U Kim
(74) *Attorney, Agent, or Firm* — Schmeiser, Olsen & Watts, LLP

(57) ABSTRACT

A Guest Operating System wake-up method, device, electronic apparatus, and a computer readable medium, which are applicable to an intelligent terminal, the intelligent terminal includes a Host Operating System and at least one Guest Operating System is provided. The method includes: determining an operating mode of the Guest Operating System after obtaining network data having the Guest Operating System as its destination address, wherein the operating mode is a suspended mode or an active mode; generating a wake-up request when the operating mode of the Guest Operating System is the suspended mode; and enabling the Guest Operating System to enter into the active mode according to the wake-up request so as to respond to the network data. The Guest Operating System enables accurate and efficient responses to network data transmission in the multi-system environment, thereby reducing reduce resource consumption and enhance user experience.

19 Claims, 6 Drawing Sheets

(52) U.S. Cl.
CPC .................. *G06F 9/45558* (2013.01); *G06F 2009/45575* (2013.01); *G06F 2009/45595* (2013.01)

(56) References Cited

FOREIGN PATENT DOCUMENTS

| | | |
|---|---|---|
| CN | 105739986 A | 7/2016 |
| CN | 107003891 A | 8/2017 |
| CN | 107810488 A | 3/2018 |

\* cited by examiner

GUEST OPERATING SYSTEM WAKE-UP METHOD, DEVICE, ELECTRONIC APPARATUS, AND READABLE MEDIUM

CROSS-REFERENCE TO RELATED APPLICATION

This application is a continuation application to PCT/CN2018/085993, with an international filing date of May 8, 2018, the entire contents of which is incorporated herein by reference.

FIELD OF TECHNOLOGY

The following relates to the field of computer information processing, and in particular to a Guest Operating System wake-up method, device, electronic apparatus, and computer readable medium.

BACKGROUND

Multiple operating systems or emulators can run on an electronic apparatus at the same time based on virtualization technologies, and multiple operating systems or emulators share a processor, a memory, and input and output devices provided by hardware devices. Multiple operating systems implement their respective system functions based on the same set of hardware. A large number of operating systems running simultaneously on an electronic apparatus will cause a great energy loss to a mobile terminal. In view of this situation, energy is often saved by suspending systems. The suspending process may be defined in the operating system as a process of being temporarily knocked out from the memory. The resources of the machine are limited. In the case of insufficient resources, the operating system makes reasonable arrangements for the programs in the memory: some processes are temporarily called out from the memory, and as conditions permit, the processes may be recalled back to the memory by the operating system, so as to re-enter a state waiting to be executed, that is, ready state; and the system will enter into the suspended state if no action is performed over a certain period of time. Suspending a system refers to saving the current running state of an emulator and retaining the system as it was before suspending is performed when the emulator is restarted again for response.

However, in conventional art, there are defects in waking up the Guest Operating System when network data arrives after suspending the guest system. Some wake-up methods in conventional art wake up the Guest Operating System frequently, thereby increasing energy consumption of the electronic apparatus. Some wake-up methods cannot properly wake up the Guest Operating System, thus the Guest Operating System cannot respond to the network data in time.

Therefore, there is a need for a new Guest Operating System wake-up method, apparatus, electronic apparatus, and computer readable medium.

The above information disclosed in this section is only for better understanding the background of the present disclosure, and thus it may include information that does not form a prior art known to those of ordinary skill in the art.

SUMMARY

An aspect relates to a Guest Operating System wake-up method, device, electronic apparatus and computer readable medium, which enables the Guest Operating System to accurate and efficient respond to network data transmission in a multi-system environment, thereby reducing resource consumption and enhancing user experience.

According to a first aspect of the disclosure, there is provided a Guest Operating System wake-up method applicable to an intelligent terminal, wherein, the intelligent terminal comprises a Host Operating System and at least one Guest Operating System, the method comprising steps of: determining an operating mode of the Guest Operating System after obtaining network data having the Guest Operating System as its destination address, wherein the operating mode is a suspended mode or an active mode; generating a wake-up request when the operating mode of the Guest Operating System is the suspended mode; and enabling the Guest Operating System to enter into the active mode according to the wake-up request so as to respond to the network data.

According to a second aspect of the disclosure, there is provided a Guest Operating System wake-up device applicable to an intelligent terminal, wherein, the intelligent terminal comprises a Host Operating System and at least one Guest Operating System, the Guest Operating System wake-up device comprising: a mode determining module configured to determine an operating mode of the Guest Operating System after obtaining network data having the Guest Operating System as its destination address, wherein the operating mode is a suspended mode or an active mode; a wake-up module configured to generate a wake-up request when the operating mode of the Guest Operating System is the suspended mode; and a response module configured to enable the Guest Operating System to enter into the active mode according to the wake-up request so as to respond to the network data.

According to a third aspect of the disclosure, an electronic apparatus is provided, including: one or more processors; and a storage device configured to store one or more programs; wherein when the one or more programs are executed by the one or more processors, the one or more processors implement the method as stated above.

According to a fourth aspect of the disclosure, a computer readable medium is provided, the computer readable medium has a computer program stored thereon, and when being executed by a processor, the program implementing the method as stated above.

The Guest Operating System wake-up method, device, electronic apparatus, and computer readable medium of the disclosure enable the Guest Operating System to accurately and efficiently respond to network data transmission in the multi-system environment, thereby reducing resource consumption and enhancing user experience.

It shall be understood that the above general description and the subsequent detailed description are merely illustrative and are not intended to limit the disclosure.

BRIEF DESCRIPTION

Some of the embodiments will be described in detail, with references to the following Figures, wherein like designations denote like members, wherein.

DETAILED DESCRIPTION

Figure 1:
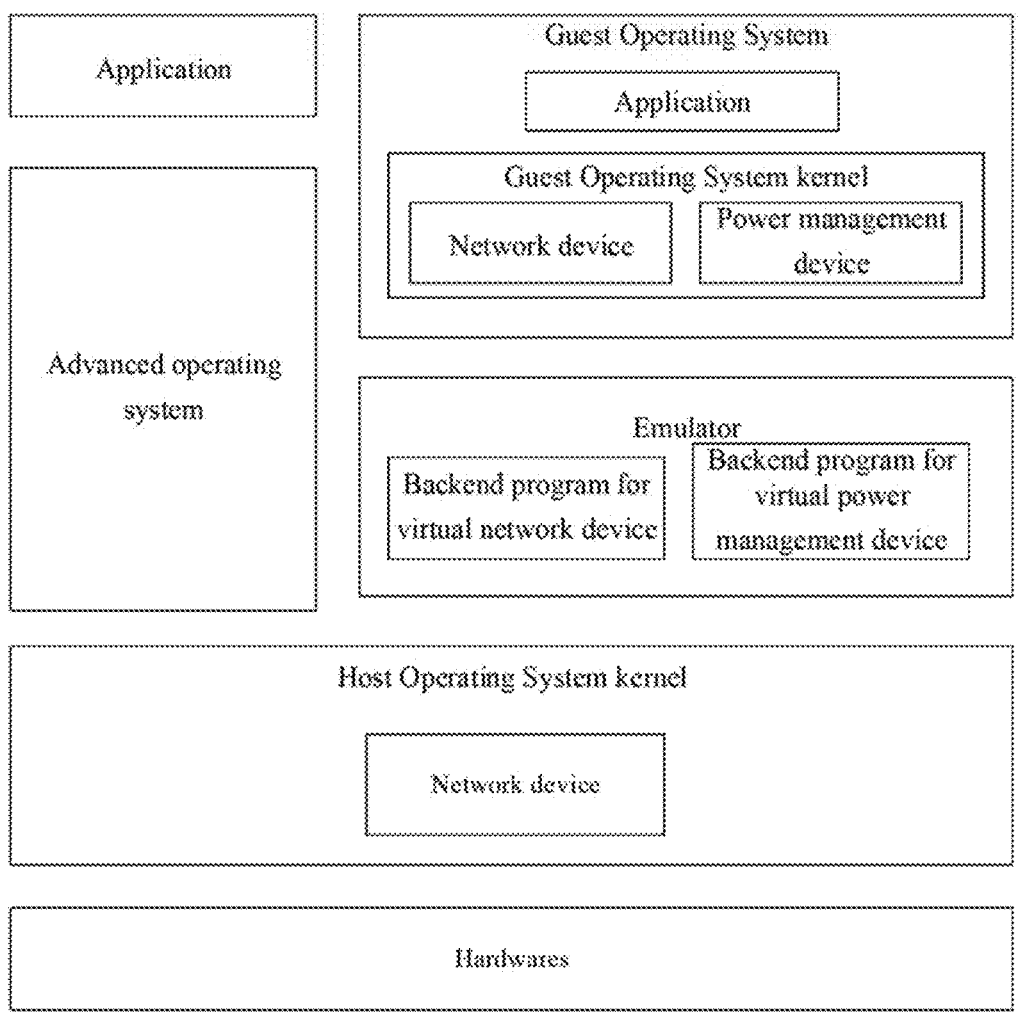
FIG. 1 is a systematic architecture diagram for a Guest Operating System wake-up method according to an exemplary embodiment.

Example embodiments will be described more comprehensively hereinafter with reference to the accompanying drawings. However, the example embodiments can be embodied in a variety of forms and should not be construed as being limited to the examples set forth herein; rather, these embodiments are provided such that this disclosure will be more comprehensive and complete, and the idea of the example embodiments will be comprehensively conveyed to those skilled in the art. The same reference numerals in the drawings denote the same or similar parts, and the repeated description thereof will be omitted.

Furthermore, the described features, structures, or characteristics may be combined in any suitable manner in one or more embodiments. In the following description, numerous specific details are set forth to facilitate fully understanding the embodiments of the present disclosure. However, those skilled in the art will appreciate that the technical solutions of the present disclosure may be practiced without one or more of the specific details, or other methods, components, devices, steps, etc. may also be employed. In other instances, methods, devices, implementations, or operations that are well-known are not shown or described in detail to avoid obscuring aspects of the present disclosure.

The block diagrams shown in the drawings are merely functional entities, which do not necessarily correspond to physically separated entities. That is, these functional entities may be implemented in software, or implemented in one or more hardware modules or integrated circuits, or implemented in different networks and/or processor devices and/or microcontroller devices.

The flowcharts shown in the drawings are merely illustrative, which do not necessarily include all of the contents and operations/steps and are not necessarily performed in the described order. For example, some operations/steps may be decomposed, and some operations/steps may be combined or partially combined, so the actual execution order may vary depending on actual situations.

Those skilled in the art shall understand that the drawings are only for schematically illustrating the exemplary embodiments, and the modules or processes in the drawings are not necessarily required for implementing the present disclosure, and therefore are not intended to limit the scope of the present disclosure.

The inventor of the present disclosure found that, in the conventional art, the implementation of energy management in a multi-system is as follows. When there is no active task in the Guest Operating System and the Guest Operating System enters into an idle state, the Guest Operating System enters into a suspended state, that is, freezing processes in a user space and in a kernel space and suspending virtual device drivers in the kernel. The virtual CPU executes an idle instruction and waits for an interruption to wake up the system. Upon receiving the interruption to wake up, the system exits the suspended state and performs processes in response to the interruption. When conditions for suspending are met again, the Guest Operating System will enter into the suspended state again. Specifically, for networks, upon receiving data, a virtual network device triggers the interruption to wake up the guest operation system, and the Guest Operating System exists the suspended state and receives network data or deal with the abnormality of the network in response to the interruption. The existing technology comprises technologies mainly based on the "goldfish" virtual hardware platform. The virtual hardware platform supports virtualizing an Android operating system under support of a QEMU emulator. QEMU is a set of analog processors that distributes source code under a GPL license, and is widely used on the GNU/Linux platform. QEMU may simulate to a speed close to that of a real computer.

The inventor of the present disclosure found that there are two defects in the conventional art. One is that there is a suspending mechanism for the Guest Operating System, however, as a virtual clock is used as a clock source in the Guest Operating System in practice, after the Guest Operating System enters into the suspended state, an interruption to the virtual clock will trigger the system to exit the suspended state. This case will be repeated, and thus the Guest Operating System would actually not remain in the suspended state for long time, and instead the Guest Operating System would in a process of entering into the suspended state and exiting the suspended state all the time. The problem becomes more serious when the system is running on an energy-constrained device. Another defect is that when the Guest Operating System actually enters into the suspended mode, a backend program for the virtual network device of the Guest Operating System remains operating, thus when network data sent to the Guest Operating System arrive, the Guest Operating System in the suspended mode cannot be woken up. This brings the backend program of the virtual network device into a chaotic state, causing errors such as loss of network data sent to the Guest Operating System.

In order to solve the technical problems stated above, the inventor of the present disclosure proposes a Guest Operating System wake-up method, which is applicable to an electronic apparatus having multiple operating systems. FIG. 1 is a systematic architecture diagram for a Guest Operating System wake-up method according to an exemplary embodiment.

As shown in FIG. 1, for example, the electronic apparatus has a Host Operating System and at least one Guest Operating System running thereon, the multiple operating systems share hardware devices in the electronic apparatus such as a mobile terminal, the hardware devices may be, for example, a CPU, a memory, a display device, peripheral devices, and input and output devices, etc. For example, naming for the systems may be performed as follows: the Host Operating System (host OS) is named as a first operating system, the Guest Operating System (guest OS) is named as a second operating system. When there are more than two operating systems, the naming may be deduced from the above, that is, the operating systems after the second may all refer to the Guest Operating Systems (guest OS). When the Guest Operating System (guest OS) is running, an emulator simulates the hardware devices for the Guest Operating System's usage. The emulator is running as an application of the Host Operating System (host OS).

When there are more than three operating systems in the system, if one Guest Operating System (guest OS) restarts due to an abnormality, the Host Operating System (host OS) and other Guest Operating Systems (guest OS) may still operate normally without any affection. Whereas, when the Host Operating System (host OS) restarts due to an abnormality, all Guest Operating Systems (guest OS) will be restarted.

An emulator is a complete computer system that is simulated by software, has the whole hardware system functionality and runs in a completely isolated environment. The virtual system is obtained by generating a completely new virtual mirror of the existing operating system, which has the same function as the real system. After entering into the virtual system, all operations are performed in this new independent virtual system, and the virtual system may install and run software independently, save data, and have its own independent desktop, which will not affect the real system. In addition, the virtual system has an operating system that may flexibly switch between the existing system and the virtual mirror.

The virtual system is different from the conventional emulator in that the virtual system does not degrade the performance of the computer; starting the virtual system does not spend much time as starting the normal system, and running program is more convenient and faster. The virtual system may only simulate the same environment as the existing operating system, while the emulator may simulate other kinds of operating systems. In addition, the emulator needs to simulate underlying hardware instructions, so the application running speed of the emulator is much slower than that of the virtual system.

In one embodiment, the Guest Operating System runs on a hardware platform which is managed by an emulator and consisted of a virtual CPU, a virtual clock, a virtual interruption manager, and virtual peripheral devices.

A virtual CPU is a main unit for instruction execution and operation. A virtual processor refers to a physical central processing unit (CPU) assigned to an emulator.

The virtual clock provides a clock source by means of which the operating system performs process scheduling and the like.

The virtual interruption manager manages interruption signals generated by various virtual peripheral devices and provided to the virtual CPU.

Virtual peripheral devices are various input and output device modules implemented by the emulator.

The emulator software running on the Host Operating System controls the real CPU of the Host Operating System to start executing emulator instructions, and controls the real CPU to switch to the Guest Operating System from the Host Operating System; and the emulator software also controls whether the Guest Operating System continues to run after switching to the Host Operating System from the Guest Operating System, etc. The emulator software also needs to operate and monitor the real input and output devices and associated files on the Host Operating System, for use by the virtual peripheral devices of the emulator.

Based on the system architecture shown in FIG. 1, in one embodiment, the following components are included in the systematic architecture diagram for the Guest Operating System wake-up method:

Hardware for the mobile terminal, which specifically includes, for example, a CPU, a memory, a display device, peripheral devices, and input/output devices, etc.;

Host Operating System including network device related programs; and emulators, advanced operating programs, and applications in the Host Operating System (for example, programs running on the mobile terminal, such as instant messaging programs, network search programs, image processing programs, map programs, etc.) run on the Host Operating System.

The emulator running on the Host Operating System includes a backend program for a virtual network device; and a backend program for a virtual power management device.

At least one Guest Operating System runs on the emulator, and the Guest Operating System includes programs running on the Guest Operating System, similar to the application programs in the Host Operating System, the application programs running on the Guest Operating System may be programs running on the mobile terminal, for example, an instant messaging program, a network search program, an image processing program, a map program, and the like. The Guest Operating System also includes a Guest Operating System kernel, which includes related system applications such as network programs and power supply programs.

In order to run virtual network devices of the Guest Operating System on the emulator, a backend program for a virtual network device as well and a backend program for a virtual power management device are simultaneously implemented. The Guest Operating System provides driver programs running on the virtual network device and the virtual power management device.

In one embodiment, the Guest Operating System includes an emulator that supports the Guest Operating System to run. The emulator includes a backend program that supports running of the virtual network device of the Guest Operating System, and a backend program for the virtual power management device. The Guest Operating System includes contents such as driver programs running on the virtual network device and the virtual power management device. The virtual power management device records a system sleep state that the current system is expected to enter into, and a phase number for a phase at which the system has entered into the desired system sleep state. The virtual network device is configured to transmit the data packets sent and received by the Guest Operating System, and communicate with the backend program for the virtual power management device to obtain the state of the Guest Operating System, and wake up the Guest Operating System when the Guest Operating System has entered into the suspended state.

Based on the above system architecture, by employing the Guest Operating System wake-up method of the present disclosure, the Guest Operating System will not be woken up by the clock source of the virtual clock after entering into the suspended mode, thus saving energy; after the Guest Operating System enters into the suspended mode, the backend program for the virtual network device on the emulator can wake up the Guest Operating System in the suspended mode when network data sent to the Guest Operating System arrive, thereby avoiding errors such as loss of network data sent to the Guest Operating System.

Figure 2:
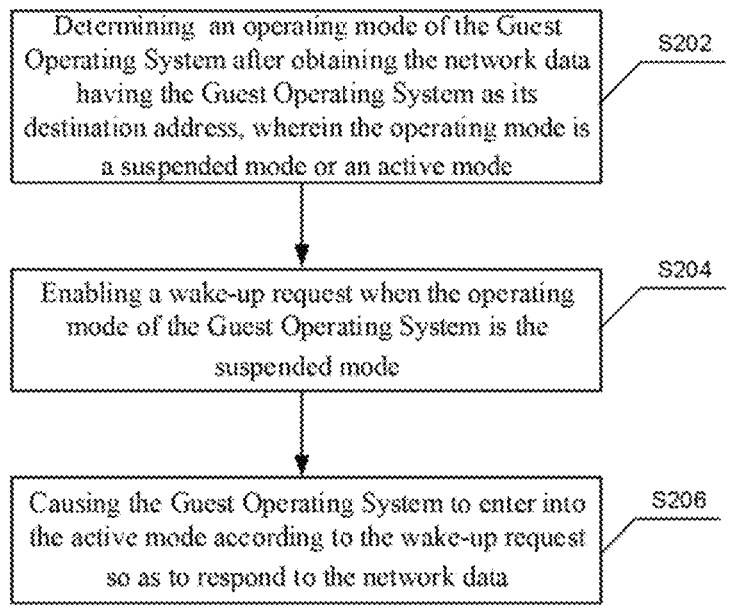
FIG. 2 is a flowchart for a Guest Operating System wake-up method according to an exemplary embodiment.

FIG. 2 is a flowchart illustrating a Guest Operating System wake-up method according to an exemplary embodiment. The Guest Operating System wake-up method 20 is applicable to the system framework described in the foregoing embodiment for the Guest Operating System wake-up method, and includes at least steps S202 to S206, which are described in detail as follows.

As shown in FIG. 2, in S202, after obtaining network data having the Guest Operating System as its destination address, the operating mode of the Guest Operating System is determined, wherein the operating mode is the suspended mode or the active mode. As described above, an emulator program runs on the Host Operating System, and the at least one Guest Operating System operates on the emulator program. The emulator program includes: the backend program for the virtual network device; and the backend program for the virtual power management device. The Guest Operating System includes: the virtual network device; and the virtual power management device.

In one embodiment, the operating mode of the Guest Operating System may be determined, for example, by the virtual power management device on the Guest Operating System.

In S204, when the operating mode of the Guest Operating System is the suspended mode, a wake-up request is generated. The wake-up request can be generated, for example, by the backend program for the virtual network device.

In S206, the Guest Operating System is enabled to enter into the active mode according to the wake-up request, so as to respond to the network data. The wake-up request may be received, for example, by the backend program for the virtual power management device. The backend program for the virtual power management device generates an interruption signal according to the wake-up request. And the Guest Operating System enters into the active mode according to the interruption signal, so as to respond to the network data.

The Guest Operating System wake-up method of the present disclosure may wake up the Guest Operating System in the suspended mode through the backend program for the virtual network device on the emulator, and thus ensure that the Guest Operating System accurately and efficiently respond to network data transmission in a multi-operating system environment, thereby reducing resource consumption and improving user experience.

It should be clearly understood that the present disclosure describes how to form and use particular examples, but the principles of the present disclosure are not limited to the details of the examples. Rather, these principles can be applied to many other embodiments based on the teachings of the disclosure.

Figure 3:
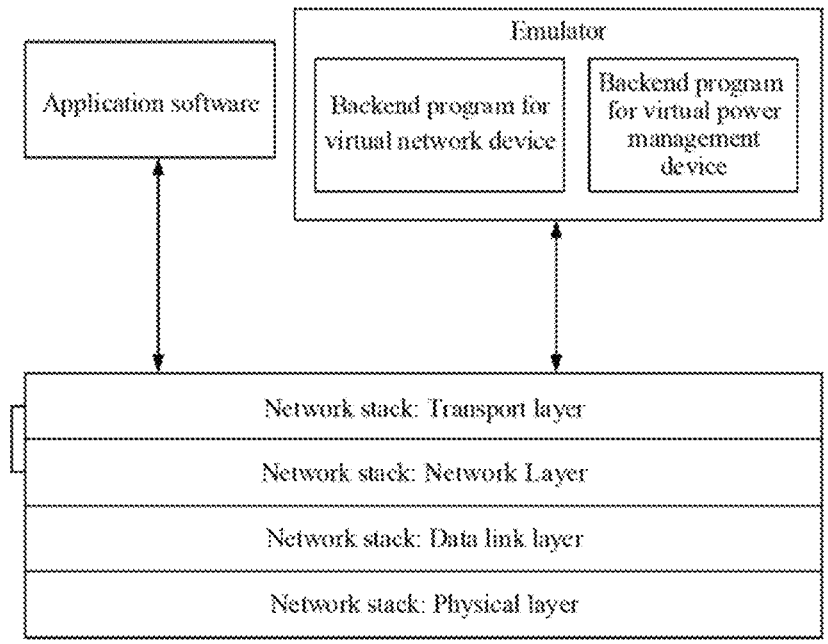
FIG. 3 is a schematic diagram illustrating data transmission in a Guest Operating System wake-up method according to an exemplary embodiment.

FIG. 3 is a schematic diagram illustrating network data transmission in a Guest Operating System wake-up method according to an exemplary embodiment. The diagram for network data transmission 30 is applicable to the framework for the Guest Operating System wake-up method system described in the foregoing embodiment, and it describes steps performed before the step S202 "obtaining network data having the Guest Operating System as its destination address".

As shown in FIG. 3, in one embodiment, the backend program for the virtual network device of the Guest Operating System obtains, from the network protocol stack of the Host Operating System, data packets sent to the Guest Operating System, and writes data packets to be sent by the Guest Operating System into the network protocol stack of the Host Operating System.

In one embodiment, the network protocol stack of the Host Operating System is responsible for determining whether the data packets it receives, or it prepares to send, are data packets for the Host Operating System or for the Guest Operating System. Specifically, for example, the backend program for the virtual network device of the Guest Operating System communicates with the backend program for the virtual power management device to obtain the current operating mode of the Guest Operating System.

In an embodiment, the network data for the Guest Operating System is transmitted for example as follows: the network protocol stack of the Host Operating System obtains network data; and the network protocol stack of the Host Operating System determines whether the destination address of the network data is the Guest Operating System.

Figure 4:
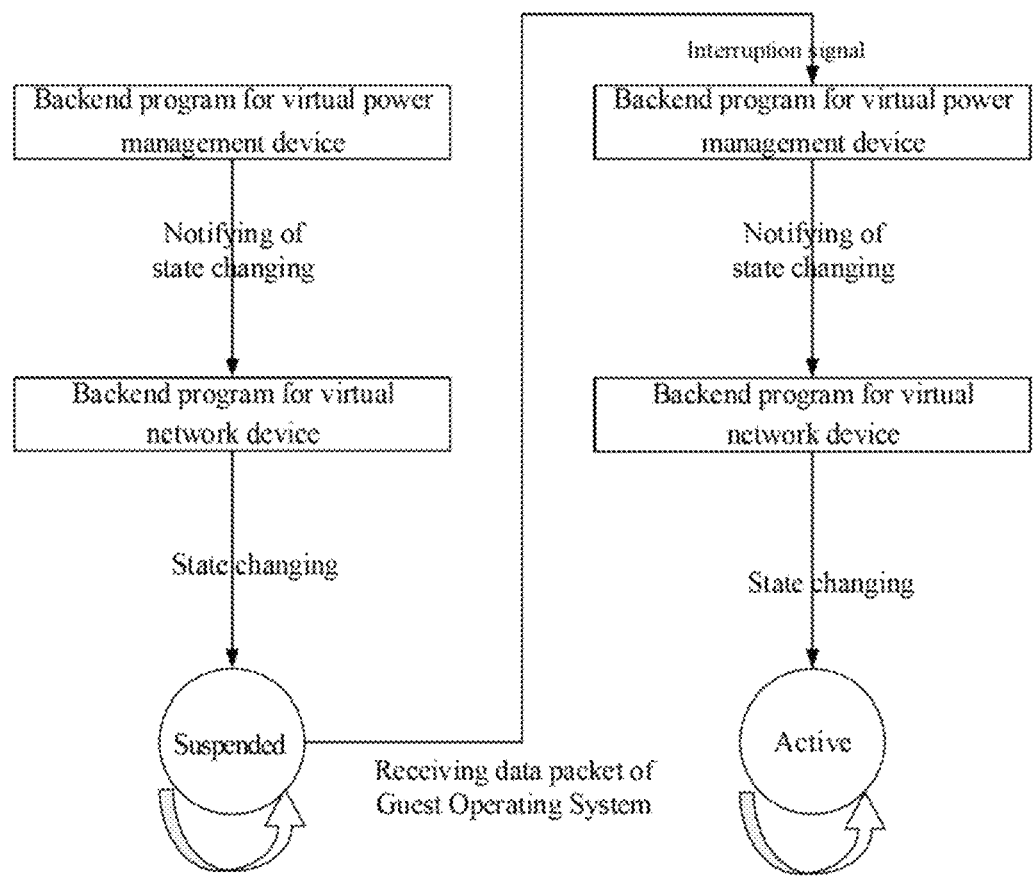
FIG. 4 is a schematic diagram for a Guest Operating System wake-up method according to another exemplary embodiment.

FIG. 4 is a schematic diagram illustrating a Guest Operating System wake-up method according to another exemplary embodiment. The schematic diagram 40 for the Guest Operating System wake-up method exemplarily depicts a schematic diagram of signal transmission when the Guest Operating System transfers from the suspended state to the active state.

In one embodiment, the step of enabling the Guest Operating System to enter into the active mode according to the wake-up request so as to respond to the network data comprises: receiving, by the backend program for the virtual power management device, the wake-up request; generating, by the backend program for the virtual power management device, an interruption signal according to the wake-up request; and enabling the Guest Operating System to enter into the active mode according to the interruption signal so as to respond to the network data. The wake-up request is generated by the backend program for the virtual network device.

In one embodiment, the step of enabling the Guest Operating System to enter into the active mode according to the wake-up request so as to respond to the network data comprises: setting the backend program for the virtual network device so that it enters into the active mode; and obtaining, by the backend program for the virtual network device, the network data in response through a network protocol stack of the Host Operating System.

In one embodiment, when the Guest Operating System exits the suspended mode and operates normally, the power management state thereof is set in the virtual power management device. The backend program for the virtual network device of the Guest Operating System sets its own mode so that it enters into the active state, and normally transmits the data packets for the Guest Operating System.

In one embodiment, when the Guest Operating System enters into the suspended mode, the power management state thereof is set in the virtual power management device. The backend program for the virtual network device of the Guest Operating System sets its own mode so that it enters into the suspended state, and upon receiving data packets sent to the Guest Operating System, the backend program for the virtual network device sends a Guest Operating System waking-up request to the backend program for the virtual power management device. After receiving an interruption reported by the power management device, the Guest Operating System exits the suspended mode, and the backend program for the virtual network device of the Guest Operating System sets its own mode so that it enters into an active state.

Figure 5:
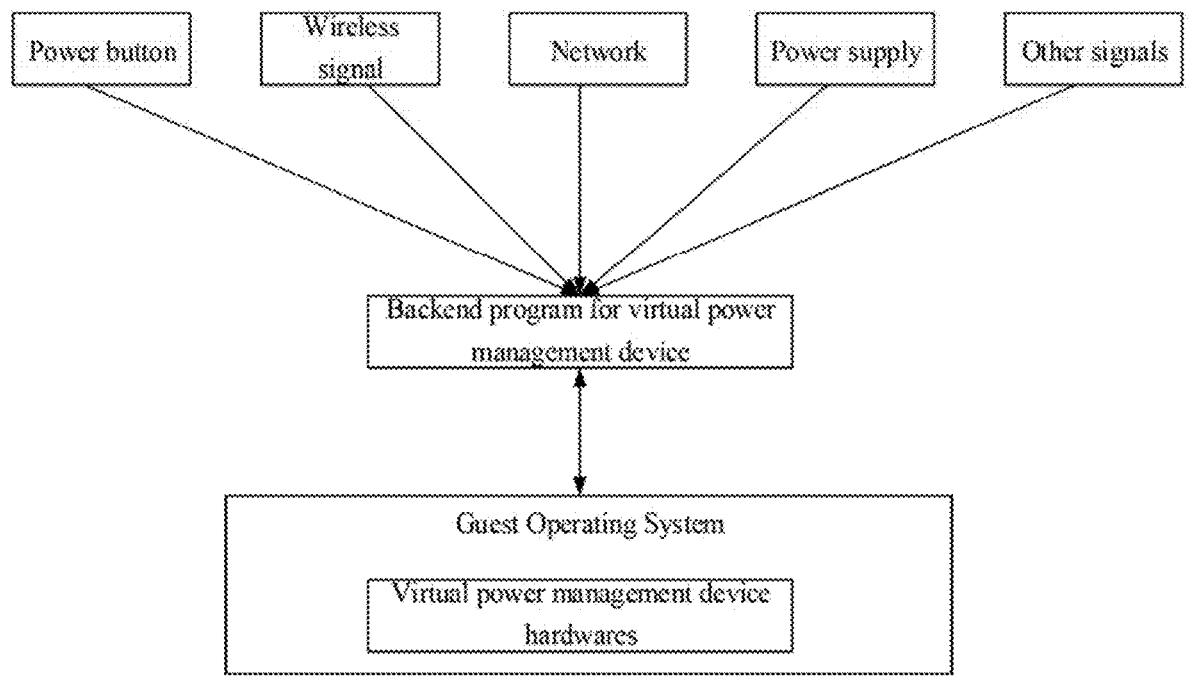
FIG. 5 is a schematic diagram illustrating an interruption signal of a Guest Operating System wake-up method according to another exemplary embodiment.

FIG. 5 is a schematic diagram illustrating an interruption signal of a Guest Operating System wake-up method according to another exemplary embodiment. When the Guest Operating System starts, driver programs for the virtual power management device and network device are started.

In one embodiment, the virtual power management device assigns an interruption source to the backend program for the virtual network device, so as to mark the interruption signal. The virtual power management device of the Guest Operating System should assign an interruption source to the backend program for the virtual network device so as to differentiate and mark the wake-up interruption from the virtual network device. When the interruption is triggered, the Guest Operating System kernel should exit the suspended mode, respond to inputs of peripheral devices, and restore the user space to run and operate applications from the corresponding peripheral devices. It is worth mentioning that apart from the interruption signal, the command that can wake up the guest operating program may also include, for example, power supply signal, operation signal for power button, etc.

It is worth mentioning that when the Guest Operating System starts, the Guest Operating System is in a background state by default. The definitions of the foreground and the background are defined as follows: before the screen of the Guest Operating System displays a timeout message, the Guest Operating System is in an active state, and correspondingly, the virtual network device is also in the active state. When the screen of the Guest Operating System displays the timeout message, if there is no task for the Guest Operating System to continue to perform, it enters into the suspended state; accordingly, the virtual network device also enters into the suspended state. After the Guest Operating System switches to the foreground state, if the screen of the Guest Operating System displays timeout message, or the power button is pressed, the Guest Operating System would enter into the suspended state if there is no task for the Guest Operating System to continue to perform. Accordingly, the virtual network device also enters into the suspended state.

Those skilled in the art will appreciate that all or a portion of the steps for implementing the above-described embodiments are implemented as a computer program executed by a CPU. When the computer program is executed by the CPU, the above-described functions defined by the above-described methods of the present disclosure are performed. The program may be stored in a computer readable storage medium, and the computer readable storage medium may be a read only memory, a magnetic disk or an optical disk, or the like.

Further, it should be noted that the above-described drawings are merely illustration for the processes included in the method according to the exemplary embodiments of the present disclosure, and they are not intended to be limiting. It is readily understood that the processing shown in the above drawings does not indicate or limit the chronological order of these processes. In addition, it is also readily understood that these processes may be, for example, performed synchronously or asynchronously in multiple modules.

The following embodiments describe a device of the present disclosure, which may be used to implement the method of the present disclosure. For details not disclosed in the embodiments for devices, please refer to the embodiments for methods of the present disclosure.

Figure 6:
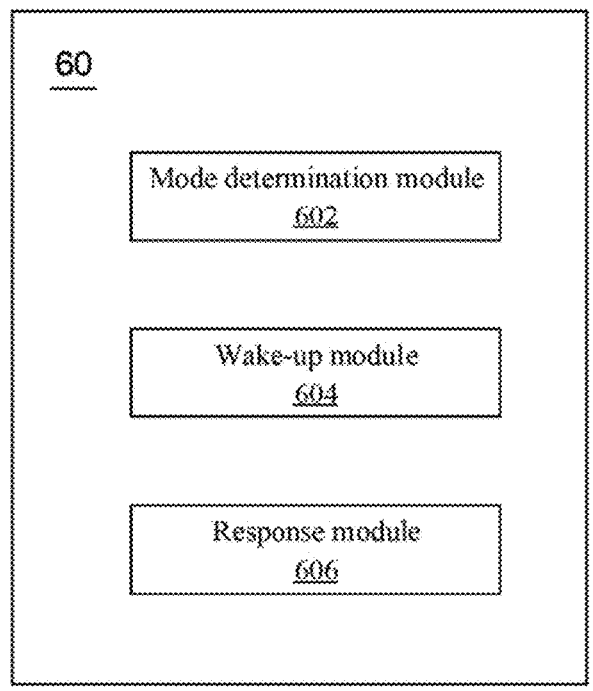
FIG. 6 is a block diagram illustrating a Guest Operating System wake-up device according to an exemplary embodiment.

FIG. 6 is a block diagram of a Guest Operating System wake-up device, according to an exemplary embodiment. The Guest Operating System wake-up device 60 includes a mode determination module 602, a wake-up module 604, and a response module 606.

The mode determination module 602 is configured to determine an operating mode of the Guest Operating System after obtaining network data having the Guest Operating System as its destination address, wherein the operating mode is a suspended mode or an active mode. Wherein the mode determination module is further configured to determine the operating mode of the Guest Operating System by the virtual power management device. Wherein, an emulator program runs on the Host Operating System, and the at least one Guest Operating System runs on the emulator program. The emulator program includes: a backend program for a virtual network device; and a backend program for a virtual power management device. The Guest Operating System includes: a virtual network device and a virtual power management device.

The wake-up module 604 is configured to generate a wake-up request when the operating mode of the Guest Operating System is the suspended mode. The wake-up module is further configured to generate the wake-up request by the backend program for the virtual network device.

The response module 606 is configured to enable the Guest Operating System to enter into the active mode according to the wake-up request so as to respond to network data. The response module includes: a receiving subunit configured to receive the wake-up request by the backend program for the virtual power management device; a signal subunit configured to generate, by the backend program for the virtual power management device, an interruption signal according to the wake-up request; and a mode subunit configured to enable the Guest Operating System to enter into the active mode according to the interruption signal so as to respond to the network data.

Wherein, the mode subunit is configured to set the backend program for the virtual network device so that it enters into the active mode; and obtain, by the backend program for the virtual network device, the network data packet in response through a network protocol stack for the Host Operating System.

The Guest Operating System wake-up device of the present disclosure may wake up the Guest Operating System in the suspended mode through the backend program for the virtual network device on the emulator, and thus ensure that the Guest Operating System accurately and efficiently respond to network data transmission in a multi-operating system environment, thereby reducing resource consumption and improving user experience.

Figure 7:
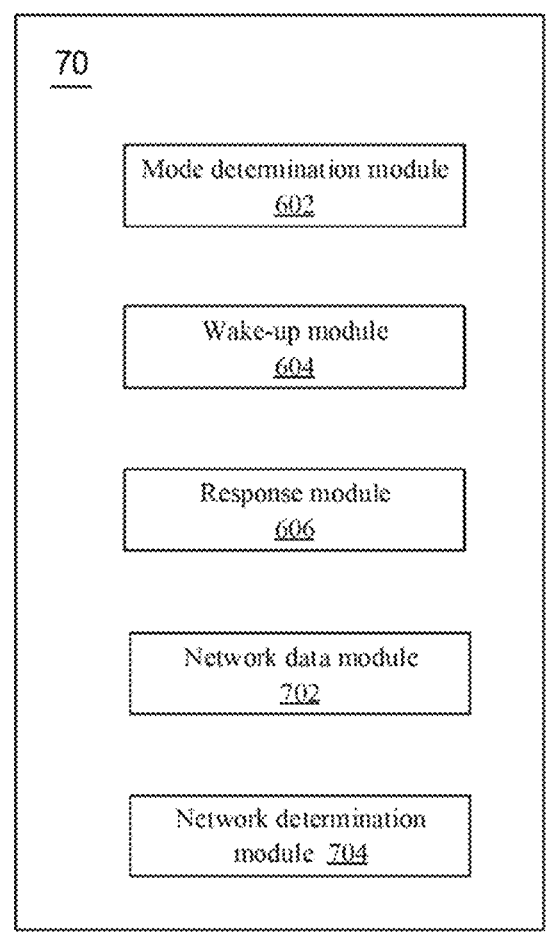
FIG. 7 is a block diagram of a Guest Operating System wake-up device according to another exemplary embodiment.

FIG. 7 is a block diagram illustrating a Guest Operating System wake-up device according to another exemplary embodiment. On the basis of the Guest Operating System wake-up device 60, the Guest Operating System wake-up device 70 further includes a network data module 702 and a network determination module 704.

The network data module 702 is configured to enable a network protocol stack of the Host Operating System to acquire network data.

The network determination module 704 is configured to enable the network protocol stack of the Host Operating System to determine whether the destination address of the network data is the Guest Operating System.

In one embodiment, the network determination module 704 in the network protocol stack of the Host Operating System is responsible for determining whether the data packets it receives, or it prepares to send are data packets for the Host Operating System or for the Guest Operating System. Specifically, for example, the backend program for the virtual network device of the Guest Operating System communicates with the backend program for the virtual power management device to obtain the current operating mode of the Guest Operating System.

Figure 8:
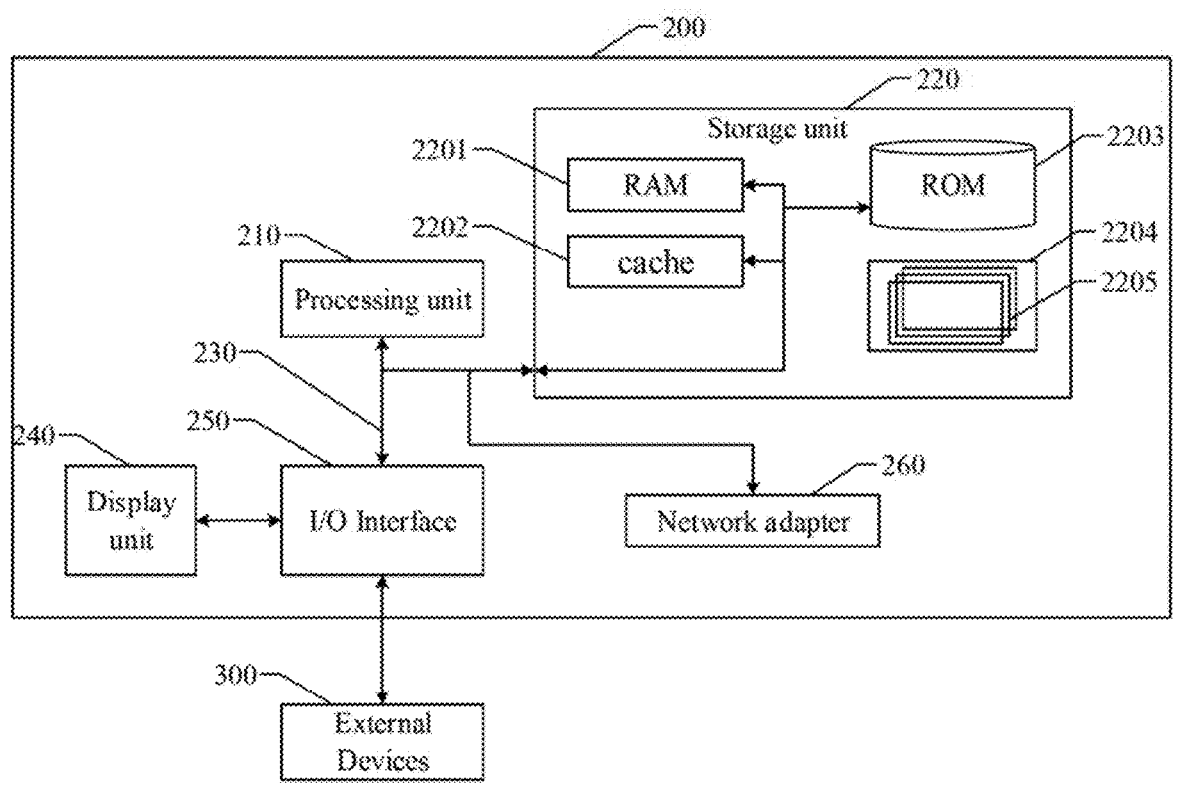
FIG. 8 is a block diagram of an electronic apparatus according to an exemplary embodiment.

FIG. 8 is a block diagram of an electronic apparatus, according to an exemplary embodiment.

An electronic apparatus 200 according to the embodiment of the present disclosure is described below with reference to FIG. 8. The electronic apparatus 200 shown in FIG. 8 is merely an example and shall not be construed as a limitation on the function and scope of the embodiments of the present disclosure.

As shown in FIG. 8, the electronic apparatus 200 may be implemented by a general purpose computing device. The components of the electronic apparatus 200 may include but not limit to: at least one processing unit 210, at least one storage unit 220, a bus 230 connecting different system components (including the storage unit 220 and the processing unit 210), a display unit 240, and the like.

The storage unit stores a program code, and the program code may be executed by the processing unit 210, such that the processing unit 210 performs steps in the exemplary embodiments of the present disclosure. For example, the processing unit 210 can perform steps shown in FIG. 3 or FIG. 6.

The storage unit 220 may include a readable medium in form of a volatile storage unit, such as a Random Access Memory unit (RAM) 2201 and/or a cache storage unit 2202, and may further include a Read Only Memory unit (ROM) 2203.

The storage unit 220 may also include a program/utility 2204 having a set of program modules 2205 (at least one program module), including but not limiting to: an operating system, one or more applications, other program modules, and program data, each or some combination of these examples may include an implementation of a network environment.

The bus 230 may be represented as one or more of several types of bus architectures, including a memory unit bus or memory unit controller, a peripheral bus, an Accelerated Graphics Port, a processing unit, or a local bus using any of a variety of bus architectures.

The electronic apparatus 200 can also communicate with one or more external devices 300 (e.g., a keyboard, a pointing device, a Bluetooth device, etc.), and can also communicate with one or more devices that enable the user to interact with the electronic apparatus 200, and/or with any devices (e.g., a router, a modem, etc.) that enables the electronic apparatus 200 to communicate with one or more other computing devices. This communication can take place via an input/output (I/O) interface 250. Moreover, the electronic apparatus 200 can also communicate with one or more networks (e.g., Local Area Network (LAN), Wide Area Network (WAN), and/or a public network, such as the Internet) via a network adapter 260. The network adapter 260 may communicate with other modules of the electronic apparatus 200 via the bus 230. It should be understood that although not shown in the figures, other hardware and/or software modules may be utilized in conjunction with electronic apparatus 200, including but not limiting to: a microcode, a device driver, a redundant processing unit, an external disk drive array, a RAID system, a tape driver and a data backup and storage systems, etc.

Through the description of the above embodiments, those skilled in the art will readily understand that the exemplary embodiments described herein may be implemented by software or by software in combination with necessary hardware. Therefore, the technical solution according to an embodiment of the present disclosure may be embodied in the form of a software product, which may be stored in a non-volatile storage medium (which may be a CD-ROM, a USB disk, a mobile hard disk, etc.) or on the network, and include a number of instructions to cause a computing device (which may be a personal computer, a server, or a network device, etc.) to perform the above-described processing methods in accordance with embodiments of the present disclosure.

Figure 9:
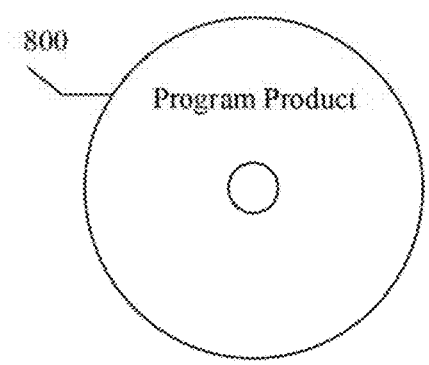
FIG. 9 is a schematic diagram illustrating a computer readable storage medium in an exemplary embodiment of the present disclosure.

FIG. 9 is a schematic diagram showing a computer readable storage medium in an exemplary embodiment of the present disclosure.

Referring to FIG. 9, which depicts a program product 800 configured to implement the above methods according to embodiments of the disclosure. The program product 800 may employ a portable Compact Disk Read Only Memory (CD-ROM) and includes program codes, and may run in a terminal device such as the personal computer. However, the program product of the present disclosure is not limited thereto, and in this document, the readable storage medium may be any tangible medium that contains or stores a program that can be used by or in connection with an instruction execution system, apparatus, or device.

The computer readable medium carries one or more programs thereon, and when the one or more programs are executed by the device, the computer readable medium is configured to perform the following functions: determining an operating mode of the Guest Operating System after obtaining network data having the Guest Operating System as its destination address, wherein the operating mode is a suspended mode or an active mode; generating a wake-up request when the operating mode of the Guest Operating System is the suspended mode; and enabling the Guest Operating System to enter into the active mode according to the wake-up request so as to respond to the network data.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'including' does not exclude other steps or elements.

What is claimed is:

1. A Guest Operating System wake-up method applicable to an intelligent terminal, wherein, the intelligent terminal comprises a Host Operating System and at least one Guest Operating System, the method comprising steps of:

determining an operating mode of the Guest Operating System after obtaining network data having the Guest Operating System as a destination address, wherein the operating mode is a suspended mode or an active mode;

generating a wake-up request when the operating mode of the Guest Operating System is the suspended mode; and enabling the Guest Operating System to enter into the active mode according to the wake-up request so as to respond to the network data;

wherein an emulator program runs on the Host Operating System, and the at least one Guest Operating System runs on the emulator program, wherein the emulator program comprises a backend program for a virtual network device; and a backend program for a virtual power management device;

wherein, the step of enabling the Guest Operating System to enter into the active mode according to the wake-up request so as to respond to the network data comprises:

receiving, by the backend program for the virtual power management device, the wake-up request, generating, by the backend program for the virtual power management device, an interruption signal according to the wake-up request, and enabling the Guest Operating System to enter into the active mode according to the interruption signal so as to respond to the network data;

wherein the backend program for the virtual network device sets a mode for itself so that the backend program for the virtual network device enters into a suspended state, and upon receiving data packets sent to the Guest Operating System, the backend program for the virtual network device sends the waking-up request to the backend program for the virtual power management device.

2. The method of claim 1, further comprising steps of:

acquiring, by a network protocol stack of the Host Operating System, the network data; and determining, by the network protocol stack of the Host Operating System, whether the destination address of the network data is the Guest Operating System.

3. The method of claim 1, wherein the Guest Operating System comprises:

a virtual network device; and a virtual power management device.

4. The method of claim 3, wherein the step of determining the operating mode of the Guest Operating System comprises:

determining the operating mode of the Guest Operating System by the virtual power management device.

5. The method of claim 1, wherein the step of generating the wake-up request comprises:

generating the wake-up request by the backend program for the virtual network device.

6. The method of claim 1, wherein enabling the Guest Operating System to enter into the active mode according to the interruption signal so as to respond to the network data comprises:

setting the backend program for the virtual network device so that the Guest Operating System enters into the active mode; and obtaining, by the backend program for the virtual network device, the network data in response through a network protocol stack for the Host Operating System.

7. The method of claim 1, wherein the virtual power management device assigns an interruption source to the backend program for the virtual network device, so as to mark the interruption signal.

8. An electronic apparatus, comprising:

one or more processors; and a storage device configured to store one or more programs;

wherein, when the one or more programs are executed by the one or more processors, the one or more processors implement a Guest Operating System wake-up method applicable to an intelligent terminal, wherein, the intelligent terminal comprises a Host Operating System and at least one Guest Operating System, the method comprising steps of:

determining an operating mode of the Guest Operating System after obtaining network data having the Guest Operating System as a destination address, wherein the operating mode is a suspended mode or an active mode;

generating a wake-up request when the operating mode of the Guest Operating System is the suspended mode; and enabling the Guest Operating System to enter into the active mode according to the wake-up request so as to respond to the network data;

wherein an emulator program runs on the Host Operating System, and the at least one Guest Operating System runs on the emulator program, wherein the emulator program comprises a backend program for a virtual network device; and a backend program for a virtual power management device;

wherein, the step of enabling the Guest Operating System to enter into the active mode according to the wake-up request so as to respond to the network data comprises:

receiving, by the backend program for the virtual power management device, the wake-up request, generating, by the backend program for the virtual power management device, an interruption signal according to the wake-up request, and enabling the Guest Operating System to enter into the active mode according to the interruption signal so as to respond to the network data;

wherein the backend program for the virtual network device sets a mode for itself so that the backend program for the virtual network device enters into a suspended state, and upon receiving data packets sent to the Guest Operating System, the backend program for the virtual network device sends the waking-up request to the backend program for the virtual power management device.

9. The electronic apparatus of claim 8, wherein the method further comprises:

acquiring, by a network protocol stack of the Host Operating System, the network data; and determining, by the network protocol stack of the Host Operating System, whether the destination address of the network data is the Guest Operating System.

10. The electronic apparatus of claim 8, wherein the Guest Operating System comprises:

a virtual network device; and a virtual power management device.

11. The electronic apparatus of claim 10, wherein determining the operating mode of the Guest Operating System comprises:

determining the operating mode of the Guest Operating System by the virtual power management device.

12. The electronic apparatus of claim 8, wherein generating the wake-up request comprises:

generating the wake-up request by the backend program for the virtual network device.

13. The electronic apparatus of claim 8, wherein enabling the Guest Operating System to enter into the active mode according to the interruption signal so as to respond to the network data comprises:

setting the backend program for the virtual network device so that the Guest Operating System enters into the active mode; and obtaining, by the backend program for the virtual network device, the network data in response through a network protocol stack for the Host Operating System.

14. The electronic apparatus of claim 8, wherein the virtual power management device assigns an interruption source to the backend program for the virtual network device, so as to mark the interruption signal.

15. A non-transitory computer readable medium having a computer program stored thereon, when being executed by a processor, the program implementing a Guest Operating System wake-up method applicable to an intelligent terminal, wherein, the intelligent terminal comprises a Host Operating System and at least one Guest Operating System, the method comprising steps of:
- determining an operating mode of the Guest Operating System after obtaining network data having the Guest Operating System as its destination address, wherein the operating mode is a suspended mode or an active mode;
- generating a wake-up request when the operating mode of the Guest Operating System is the suspended mode; and
- enabling the Guest Operating System to enter into the active mode according to the wake-up request so as to respond to the network data;
- wherein an emulator program runs on the Host Operating System, and the at least one Guest Operating System runs on the emulator program, wherein the emulator program comprises a backend program for a virtual network device; and a backend program for a virtual power management device;
- wherein, the step of enabling the Guest Operating System to enter into the active mode according to the wake-up request so as to respond to the network data comprises:
  - receiving, by the backend program for the virtual power management device, the wake-up request,
  - generating, by the backend program for the virtual power management device, an interruption signal according to the wake-up request, and
  - enabling the Guest Operating System to enter into the active mode according to the interruption signal so as to respond to the network data;
- wherein the backend program for the virtual network device sets a mode for itself so that the backend program for the virtual network device enters into a suspended state, and upon receiving data packets sent to the Guest Operating System, the backend program for the virtual network device sends the waking-up request to the backend program for the virtual power management device.

16. The non-transitory computer readable medium of claim 15, wherein the method further comprises:
- acquiring, by a network protocol stack of the Host Operating System, the network data; and
- determining, by the network protocol stack of the Host Operating System, whether the destination address of the network data is the Guest Operating System.

17. The non-transitory computer readable medium of claim 15, wherein the Guest Operating System comprises:
- a virtual network device; and
- a virtual power management device.

18. The non-transitory computer readable medium of claim 17, wherein determining the operating mode of the Guest Operating System comprises:
- determining the operating mode of the Guest Operating System by the virtual power management device.

19. The non-transitory computer readable medium of claim 15, wherein generating the wake-up request comprises:
- generating the wake-up request by the backend program for the virtual network device.

\* \* \* \* \*